(12) United States Patent
Park et al.

(10) Patent No.: US 9,621,710 B2
(45) Date of Patent: Apr. 11, 2017

(54) TERMINAL AND MENU DISPLAY METHOD THEREOF

(75) Inventors: Jun-Serk Park, Seoul (KR); Moon-Ju Kim, Gyeonggi-Do (KR); Hye-Jin Ryu, Seoul (KR); Dong-Seok Lee, Seoul (KR)

(73) Assignee: LG Electronics Inc., Seoul (KR)

(*) Notice: Subject to any disclaimer, the term of this patent is extended or adjusted under 35 U.S.C. 154(b) by 1123 days.

(21) Appl. No.: 12/403,528

(22) Filed: Mar. 13, 2009

(65) Prior Publication Data

US 2010/0062811 A1 Mar. 11, 2010

(30) Foreign Application Priority Data

Sep. 11, 2008 (KR) ........................ 10-2008-0089966

(51) Int. Cl.
| | |
|---|---|
| *H04M 1/725* | (2006.01) |
| *G06F 3/0482* | (2013.01) |
| G06F 3/0486 | (2013.01) |
| H04N 5/44 | (2011.01) |
| H04N 21/422 | (2011.01) |
| H04M 1/23 | (2006.01) |

(52) U.S. Cl.
CPC ...... *H04M 1/72586* (2013.01); *G06F 3/0482* (2013.01); *G06F 3/0486* (2013.01); *H04M 1/236* (2013.01); *H04M 2250/22* (2013.01); *H04N 21/42206* (2013.01); *H04N 21/42208* (2013.01); *H04N 2005/443* (2013.01); *H04N 2005/4442* (2013.01); *H04N 2005/4444* (2013.01)

(58) Field of Classification Search
CPC ............. H04M 1/72586; G06F 3/0486; H04N 2005/443; H04N 2005/4442; H04N 2005/4444; H04N 21/42206; H04N 21/42208

USPC .................................................. 715/829, 738
See application file for complete search history.

(56) References Cited

U.S. PATENT DOCUMENTS

| | | | | |
|---|---|---|---|---|
| 4,931,783 A | * | 6/1990 | Atkinson | ............... G06F 3/0482 345/163 |
| 5,442,795 A | * | 8/1995 | Levine et al. | ................. 715/775 |
| 5,668,966 A | * | 9/1997 | Ono | ................... G06F 17/30398 715/835 |
| 5,764,873 A | * | 6/1998 | Magid | .................... G06F 3/0486 715/769 |

(Continued)

FOREIGN PATENT DOCUMENTS

| | | | | |
|---|---|---|---|---|
| DE | 102008014081 A1 | * | 10/2008 | ............... H04M 1/23 |
| DE | EP 2093664 A1 | * | 8/2009 | ............... G06F 8/34 |

(Continued)

OTHER PUBLICATIONS

Korean Office Action dated May 30, 2014 issued in Application No. 10-2008-0089966.

*Primary Examiner* — Jeffrey A Gaffin
*Assistant Examiner* — John M Heffington
(74) *Attorney, Agent, or Firm* — KED & Associates LLP

(57) ABSTRACT

A method for displaying menu items and a terminal for implementing the same are disclosed to improve user convenience. The terminal includes: a display unit; a controller for displaying arbitrary menu items on the display unit such that menu items at a particular position are differentiated from menu items at a different position, and a user input unit for selectively rearranging the position of the menu items by a user.

18 Claims, 12 Drawing Sheets

(56) References Cited

U.S. PATENT DOCUMENTS

| | | | |
|---|---|---|---|
| 5,903,268 A * | 5/1999 | Hirayama | 715/799 |
| 6,018,571 A * | 1/2000 | Langlois | G06F 3/0481 379/201.02 |
| 6,068,485 A * | 5/2000 | Linebarger | G09B 19/04 434/116 |
| 6,115,043 A | 9/2000 | Levine et al. | 715/837 |
| 6,262,724 B1 * | 7/2001 | Crow | G06F 3/048 715/723 |
| 6,393,429 B1 * | 5/2002 | Yagi | G06F 3/0481 707/795 |
| 6,411,292 B1 * | 6/2002 | Cook | G06F 3/04815 345/419 |
| 6,587,556 B1 * | 7/2003 | Judkins | H04M 3/5233 379/219 |
| 6,600,936 B1 * | 7/2003 | Karkkainen et al. | 455/566 |
| 6,728,659 B1 * | 4/2004 | Nguyen et al. | 702/182 |
| 6,772,093 B2 * | 8/2004 | Nguyen et al. | 702/182 |
| 6,850,848 B2 * | 2/2005 | Nguyen et al. | 702/34 |
| 6,880,128 B2 * | 4/2005 | Nguyen | 715/744 |
| 7,173,619 B2 * | 2/2007 | Hill et al. | 345/428 |
| 7,512,902 B2 * | 3/2009 | Robertson | G06F 3/0481 715/782 |
| 7,548,239 B2 * | 6/2009 | Hill et al. | 345/428 |
| 7,590,946 B2 * | 9/2009 | Okamura | 715/786 |
| 7,603,182 B2 * | 10/2009 | Sano et al. | 700/15 |
| 7,620,906 B2 * | 11/2009 | Igeta | 715/769 |
| 7,830,409 B2 * | 11/2010 | Hwang | H04N 7/152 348/14.13 |
| 8,155,837 B2 * | 4/2012 | Aoki et al. | 701/41 |
| 8,161,400 B2 * | 4/2012 | Kwon | 715/769 |
| 8,296,684 B2 * | 10/2012 | Duarte | G06F 3/0481 715/863 |
| 2003/0210279 A1 * | 11/2003 | Masuda | G06Q 30/06 715/810 |
| 2004/0003411 A1 * | 1/2004 | Nakai et al. | 725/105 |
| 2004/0254465 A1 * | 12/2004 | Sano et al. | 600/443 |
| 2005/0022236 A1 * | 1/2005 | Ito et al. | 725/39 |
| 2005/0086611 A1 * | 4/2005 | Takabe et al. | 715/823 |
| 2005/0259087 A1 * | 11/2005 | Hoshino et al. | 345/173 |
| 2006/0007242 A1 * | 1/2006 | Hill et al. | 345/619 |
| 2006/0048069 A1 * | 3/2006 | Igeta | G06F 3/0486 715/769 |
| 2006/0109975 A1 * | 5/2006 | Judkins | H04M 3/5233 379/265.02 |
| 2006/0143577 A1 * | 6/2006 | Hsieh et al. | 715/815 |
| 2006/0290714 A1 * | 12/2006 | Hill et al. | 345/619 |
| 2007/0003224 A1 * | 1/2007 | Krikorian et al. | 386/95 |
| 2007/0022389 A1 * | 1/2007 | Ording | G06F 3/0481 715/790 |
| 2007/0033539 A1 * | 2/2007 | Thielman et al. | 715/769 |
| 2007/0036346 A1 * | 2/2007 | Kwon | 379/413 |
| 2007/0083911 A1 * | 4/2007 | Madden et al. | 725/135 |
| 2007/0189737 A1 * | 8/2007 | Chaudhri et al. | 386/125 |
| 2007/0240073 A1 * | 10/2007 | McCarthy et al. | 715/767 |
| 2008/0005690 A1 * | 1/2008 | Van Vugt | 715/765 |
| 2008/0005700 A1 * | 1/2008 | Morikawa | 715/841 |
| 2008/0084389 A1 * | 4/2008 | Mac | H04N 5/4403 345/158 |
| 2008/0094421 A1 * | 4/2008 | Maeda | 345/661 |
| 2008/0195961 A1 * | 8/2008 | Bae et al. | 715/769 |
| 2008/0259047 A1 * | 10/2008 | Jung | 345/173 |
| 2008/0279475 A1 * | 11/2008 | Lee | G06F 3/0481 382/276 |
| 2008/0304639 A1 * | 12/2008 | McDonough et al. | 379/93.01 |
| 2008/0305815 A1 * | 12/2008 | McDonough | 455/466 |
| 2008/0313568 A1 * | 12/2008 | Park et al. | 715/835 |
| 2009/0058821 A1 * | 3/2009 | Chaudhri et al. | 345/173 |
| 2009/0074265 A1 * | 3/2009 | Huang et al. | 382/128 |
| 2009/0119609 A1 * | 5/2009 | Matsumoto | G06F 3/04817 715/769 |
| 2009/0132388 A1 * | 5/2009 | Omori | G06F 17/30398 705/26.1 |
| 2009/0150823 A1 * | 6/2009 | Orr | G06F 3/0481 715/788 |
| 2009/0164062 A1 * | 6/2009 | Aoki et al. | 701/36 |
| 2009/0178008 A1 * | 7/2009 | Herz et al. | 715/840 |
| 2009/0234474 A1 * | 9/2009 | Steiner et al. | 700/94 |
| 2009/0282003 A1 * | 11/2009 | Hirata | 707/3 |
| 2009/0288012 A1 * | 11/2009 | Hertel et al. | 715/738 |
| 2009/0289903 A1 * | 11/2009 | Chen et al. | 345/173 |
| 2010/0036734 A1 * | 2/2010 | Pan | 705/14.55 |
| 2010/0087185 A1 * | 4/2010 | Hawkins et al. | 455/422.1 |
| 2010/0169955 A1 * | 7/2010 | Happonen | G06F 3/01 726/4 |
| 2010/0186040 A1 * | 7/2010 | Ito et al. | 725/44 |
| 2010/0267449 A1 * | 10/2010 | Gagner | G07F 17/3211 463/30 |
| 2011/0016391 A1 * | 1/2011 | Borovsky et al. | 715/702 |
| 2011/0119298 A1 * | 5/2011 | Arrasvuori et al. | 707/769 |
| 2011/0145049 A1 * | 6/2011 | Hertel et al. | 705/14.23 |
| 2011/0243525 A1 * | 10/2011 | Chaudhri et al. | 386/234 |

FOREIGN PATENT DOCUMENTS

| | | | |
|---|---|---|---|
| JP | 2002-215287 A | | 7/2002 |
| JP | 2006259986 A | * | 9/2006 |
| JP | 2007317205 A | * | 12/2007 |
| JP | 2008-204186 A | | 9/2008 |
| JP | 2009116789 A | * | 5/2009 |
| KR | 10-2007-0120368 A | | 12/2007 |
| KR | 10-0784969 B1 | | 12/2007 |
| WO | WO 0063766 A1 * | 10/2000 | G06F 3/048 |
| WO | WO2007/094894 | | 8/2007 |

* cited by examiner

TERMINAL AND MENU DISPLAY METHOD THEREOF

CROSS REFERENCE TO RELATED APPLICATIONS

The present application claims priority to Korean Application No. 10-2008-0089966 filed in Korea on Sep. 11, 2008, the entire contents of which is hereby incorporated by reference in its entirety.

BACKGROUND

1. Field

One or more embodiments disclosed herein relate to displaying information on an electronic device.

2. Background

Terminals may be divided into a mobile terminal (portable terminal) and a stationary terminal according to whether the terminal is portable or not. The mobile terminals may be divided into a handheld terminal that can be directly carried around and a vehicle mount terminal.

According to diversification of functions, the terminals are implemented in the form of multimedia players having complex functions such as capturing images or video, reproducing music or video files, playing games, receiving broadcasts, etc. In order to support or increase the functions of the terminals, modifications of structural parts and/or software parts of the terminals may be taken into consideration.

Recently, mobile terminals have various supplementary functions and a user interface using graphics. The size, color or position of respective menu items are set as default in the user interface according to terminals. In this case, the position, size or color of the menu items set as default in the user interface cannot be arbitrarily changed according to a user preference in using the mobile terminal.

BRIEF DESCRIPTION OF THE DRAWINGS

The embodiments will be described in detail with reference to the following drawings in which like reference numerals refer to like elements wherein.

DETAILED DESCRIPTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast terminals, PDAs (Personal Digital Assistants), PMPs (Portable Multimedia Player), navigation devices, etc. However, except for the case where the configuration according to embodiments of the present invention is applicable only to mobile terminals, it would be understood by a person in the art that the present invention can be also applicable to the fixed terminals such as digital TVs, desktop computers, etc.

Figure 1:
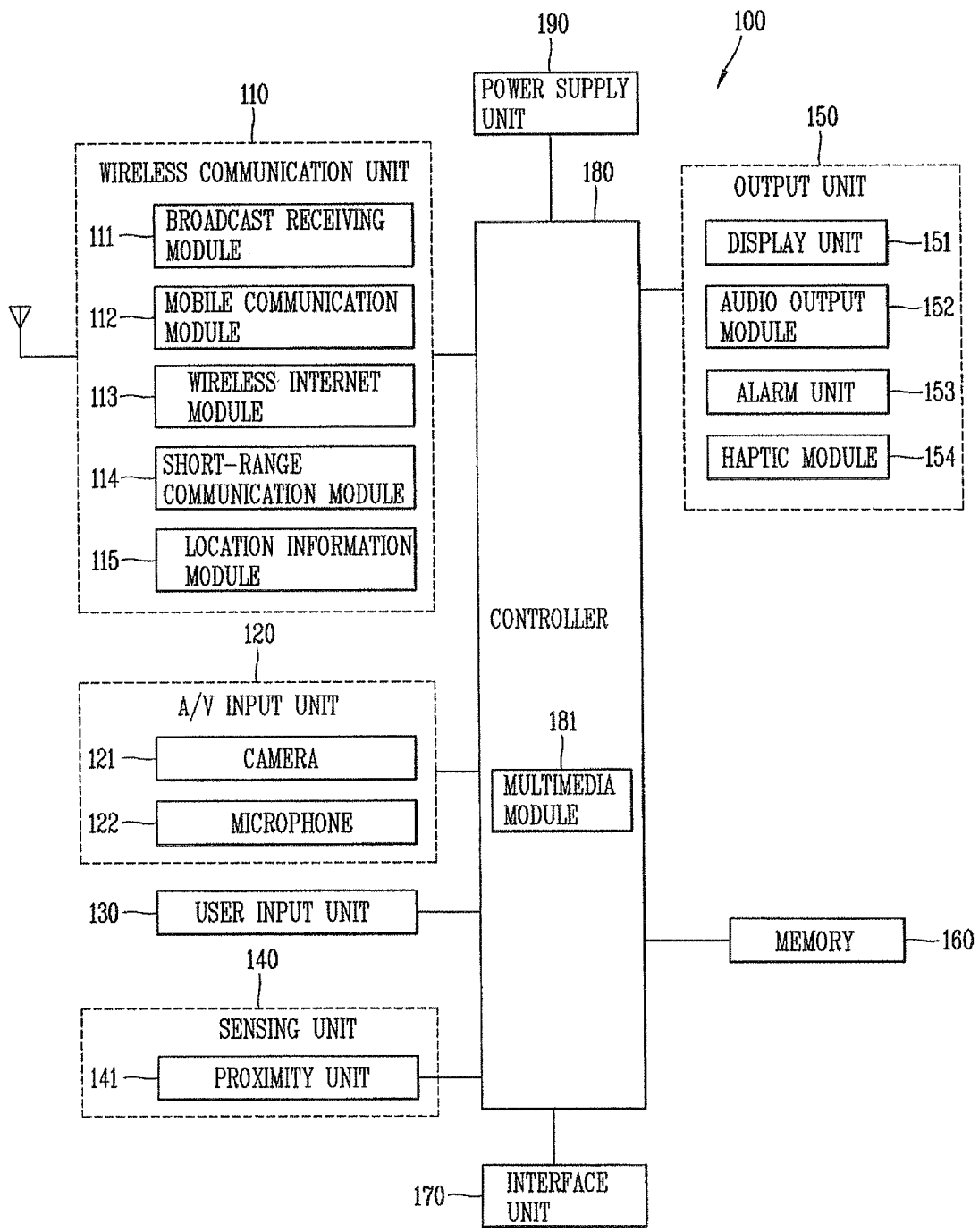
FIG. 1 is a schematic block diagram of a mobile terminal implementing an embodiment of the present invention.

FIG. 1 is a block diagram of mobile terminal 100 in accordance with an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. The components as shown in FIG. 1 are not a requirement, and greater or fewer components may alternatively be implemented.

The components will be described in detail as follows.

The wireless communication unit 110 of FIG. 1 may include one or more components allowing radio communication between the mobile terminal 100 and a wireless communication system or a network in which the mobile terminal is located. For example, the wireless communication unit may include a broadcast receiving module 111, a mobile communication module 112, a wireless Internet module 113, a short-range communication module 114, and a location information module 115, etc.

The broadcast receiving module 111 receives broadcast signals and/or broadcast associated information from an external broadcast management server via a broadcast channel.

The broadcast channel may include a satellite channel and a terrestrial channel. The broadcast management server may refer to a server that generates and transmits a broadcast signal and/or broadcast associated information or a server that receives a previously generated broadcast signal and/or broadcast associated information and transmits the same to a terminal. The broadcast signal may include not only a TV broadcast signal, a radio broadcast signal and a data broadcast signal, but also a broadcast signal obtained by combining a data broadcast signal to the TV or radio broadcast signal.

The broadcast associated information may be information related to a broadcast channel, a broadcast program or a broadcast service provider. The broadcast associated information may be provided via a mobile communication network. In this case, the broadcast associated information may be received by the mobile communication module 112.

The broadcast associated information may exist in various forms. For example, it may exist in the form of an electronic program guide (EPG) or digital multimedia broadcasting (DMB), electronic service guide (ESG) of digital video broadcast-handheld (DVB-H), etc.

The broadcast receiving module 111 may receive digital broadcast signals by using digital broadcast systems such as multimedia broadcasting-terrestrial (DMB-T), digital multimedia broadcasting-satellite (DMB-S), media forward link only (MediaFLO®), digital video broadcast-handheld (DVB-H), integrated services digital broadcast-terrestrial (ISDB-T), etc. The broadcast receiving module 111 may be configured to be suitable for any other broadcast systems as well as the above-described digital broadcast systems.

Broadcast signals and/or broadcast-associated information received via the broadcast receiving module 111 may be stored in the memory 160.

The mobile communication module 112 transmits and receives radio signals to and from at least one of a base station, an external terminal and a server. Such radio signals may include a voice call signal, a video call signal or various types of data according to text/multimedia message transmission and reception.

The wireless Internet module 113 refers to a module for a wireless Internet access. This module may be internally or externally coupled to the terminal. The wireless Internet technique may include a WLAN (Wireless LAN) (Wi-Fi), Wibro (Wireless broadband), Wimax (World Interoperability for Microwave Access), HSDPA (High Speed Downlink Packet Access), etc.

The short-range communication module 114 refers to a module for short-range communication. As the short range communication technologies, Bluetooth, radio frequency identification (RFID), infrared data association (ItDA), ultra-wideband (UWB), ZigBee, etc. may be used.

The location information module 115 is a module for checking or acquiring a location of the mobile terminal. A GPS (Global Positioning System) module is a typical example of the location information module 115.

With reference to FIG. 1, the A/V input unit 120 is configured to receive an audio or video signal. The A/V input unit 120 may include a camera 121, a microphone 122, etc. The camera 121 processes image frames of still pictures or video. The processed image frames may be displayed on a display unit 151.

The image frames processed by the camera 121 may be stored in the memory 160 or transmitted to outside via the wireless communication unit 110. Two or more cameras 121 may be provided according to a usage environment.

The microphone 122 receives an external audio signal while in a phone call mode, a recording mode, a voice recognition mode, etc., and processes it into electrical audio data. The processed audio data may be converted for output into a format transmittable to a mobile communication base station via the mobile communication module 112 in case of the phone call mode. The microphone 122 may include various types of noise canceling algorithms to cancel noise generated in the course of receiving and transmitting external audio signals.

The user input unit 130 generates input data to control an operation of the mobile terminal. The user input unit 130 may include a keypad, a dome switch, a touch pad (e.g., static pressure/capacitance), a jog wheel, a jog switch, etc.

The sensing unit 140 detects a current status of the mobile terminal 100 such as an opened or closed state of the mobile terminal 100, a location of the mobile terminal 100, a presence or absence of user contact with the mobile terminal 100, orientation of the mobile terminal 100, an acceleration or deceleration movement of the mobile terminal 100, etc., and generates a sensing signal for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 generates an output related to the sense of sight, the sense of hearing or the sense of touch and may include the display unit 151, the audio output module 152, the alarm unit 153, and a haptic module 154.

The display unit 151 displays (outputs) information processed in the mobile terminal 100. For example, when the mobile terminal 100 is in a phone call mode, the display unit 151 displays a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED), a flexible display and a three-dimensional (3D) display.

Some of them may be configured to be transparent to allow viewing of the exterior therethrough, which may be called transparent displays. A typical transparent display may be, for example, a TOLED (Transparent Organic Light Emitting Diode), or the like. The rear structure of the display unit 151 may include the light transmissive structure. With such a structure, the user can view an object located at a rear side of the terminal body through the region occupied by the display unit 151 of the terminal body.

The mobile terminal 100 may include two or more display units according to its embodiment. For example, a plurality of display units may be separately or integrally disposed on one surface or disposed on both surfaces of the mobile terminal, respectively.

When the display unit 151 and a sensor (referred to as a 'touch sensor', hereinafter) are overlaid in a layered manner (referred to as a 'touch screen', hereinafter), the display unit 151 may be used as both an input device and an output device. The touch sensor may have the form of, for example, a touch film, a touch sheet, a touch pad, etc.

The touch sensor may be configured to convert a pressure applied to a particular portion of the display unit 151 or a change in capacitance at a particular portion of the display unit 151 into an electrical input signal. The touch sensor may be configured to detect the pressure when a touch is applied, as well as a touched position or area.

When a touch with respect to the touch sensor is inputted, corresponding signal (signals) are transmitted to a touch controller. The touch controller processes the signal (signals) and transmits corresponding data to the controller 180. Thus, the controller 180 can recognize which portion of the display unit 151 has been touched.

With reference to FIG. 1, a proximity sensor 141 may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, to inform about an occurrence of an event. The video or audio signals may be also outputted via the audio output module 152, so the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

Figure 2A:
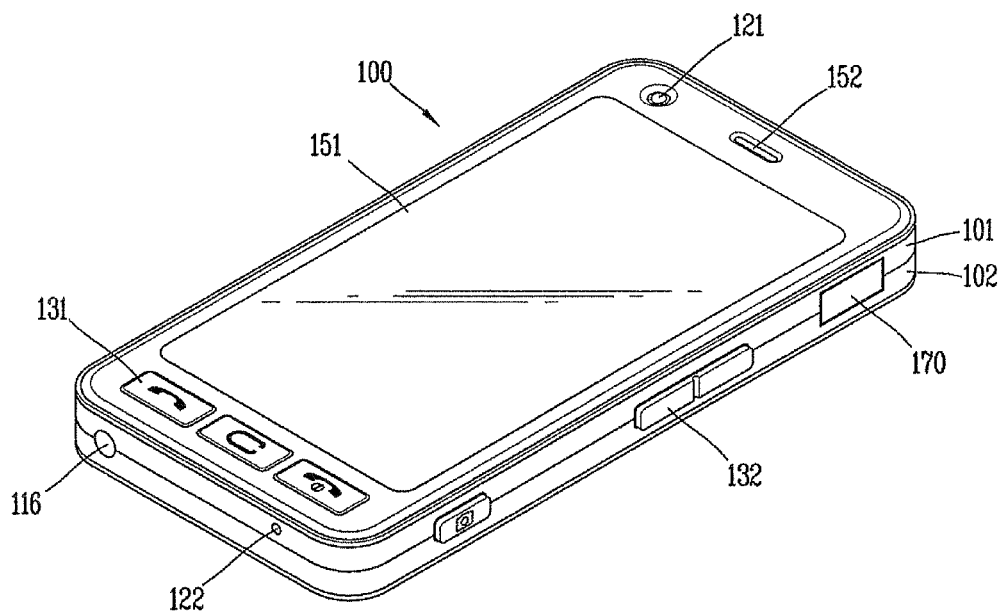
FIG. 2A is a front perspective view of a mobile terminal implementing an embodiment of the present invention.

FIG. 2a is a front perspective view of the mobile terminal according to an embodiment of the present invention.

The mobile terminal has a bar type terminal body. However, the present invention is not limited thereto and may be applicable to a slide type mobile terminal, a folder type mobile terminal, a swing type mobile terminal, a swivel type mobile terminal, etc, in which two or more bodies are combined to be relatively movable.

The body includes a case (or casing, housing, cover, etc.) constituting the external appearance. In this embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130, 131, 132, the microphone 122, the interface unit 170, etc. may be disposed mainly on the front case 101.

The display unit 151 takes most portion of a circumferential surface of the front case 101. The audio output unit 151 and the camera 121 are disposed at a region adjacent to one end portion among both end portions of the display unit 151, and the user input unit 131 and the microphone 122 are disposed at a region adjacent to another end portion. The user input unit 132 and the interface unit 170 may be disposed at the sides of the front case 101 and the rear case 102.

The user input unit 130 in FIG. 1 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content inputted by the first and second manipulation units 131 and 132 can be variably set. For example, the first manipulation unit 131 may receive a command such as starting, ending, scrolling, etc., and the second manipulation unit 32 may receive a command such as controlling the size of a sound outputted from the audio output unit 152 or conversion into a touch recognition mode of the display unit 151.

Figure 2B:
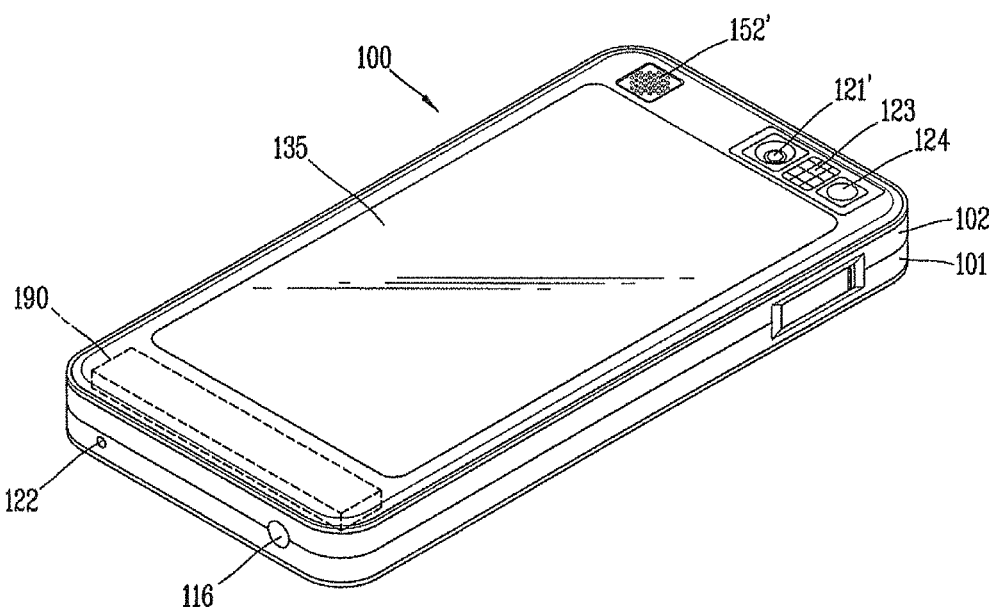
FIG. 2B is a rear perspective view of a mobile terminal implementing an embodiment of the present invention.

FIG. 2B is a rear perspective view of the mobile terminal as shown in FIG. 2A.

With reference to FIG. 2B, a camera 121' may additionally be disposed on the rear surface of the terminal body, namely, on the rear case 102. The camera 121' may have an image capture direction which is substantially opposite to that of the camera 121 (See FIG. 2A), and have a different number of pixels than the camera 121.

For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may be installed on the terminal body such that they can be rotatable or popped up.

A flash 123 and a mirror 124 may be additionally disposed adjacent to the camera 121'. When an image of a subject is captured with the camera 121', the flash 123 illuminates the subject. The mirror 124 allows the user to view themselves when the user wants to capture their own image (i.e., self-image capturing) by using the camera 121'.

An audio output unit 152' may be additionally disposed on the rear surface of the terminal body. The audio output module 152' may implement stereophonic sound functions in conjunction with the audio output module 152 (See FIG. 2a) and may be also used for implementing a speaker phone mode for call communication.

A broadcast signal receiving antenna 116 may be disposed at the side of the terminal body, in addition to an antenna that is used for mobile communications. The antenna 116 constituting a portion of the broadcast receiving module 111 (See FIG. 1) can also be configured to be retractable from the terminal body.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive like the display unit 151. In this case, when the display unit 151 is configured to output visual information from both sides thereof, the visual information may be recognized also via the touch pad 135. Alternatively, a display may be additionally mounted on the touch pad so that a touch screen may be disposed on the rear case 102.

The touch pad 135 is operated in association with the display unit 151 of the front case 101. The touch pad 135 may be disposed to be parallel on the rear side of the display unit 151. The touch pad 135 may have the same size as the display unit 151 or smaller.

The associated operation method of the display unit 151 and the touch pad 135 will now be described with reference to FIGS. 3A and 3B.

Figure 3A:
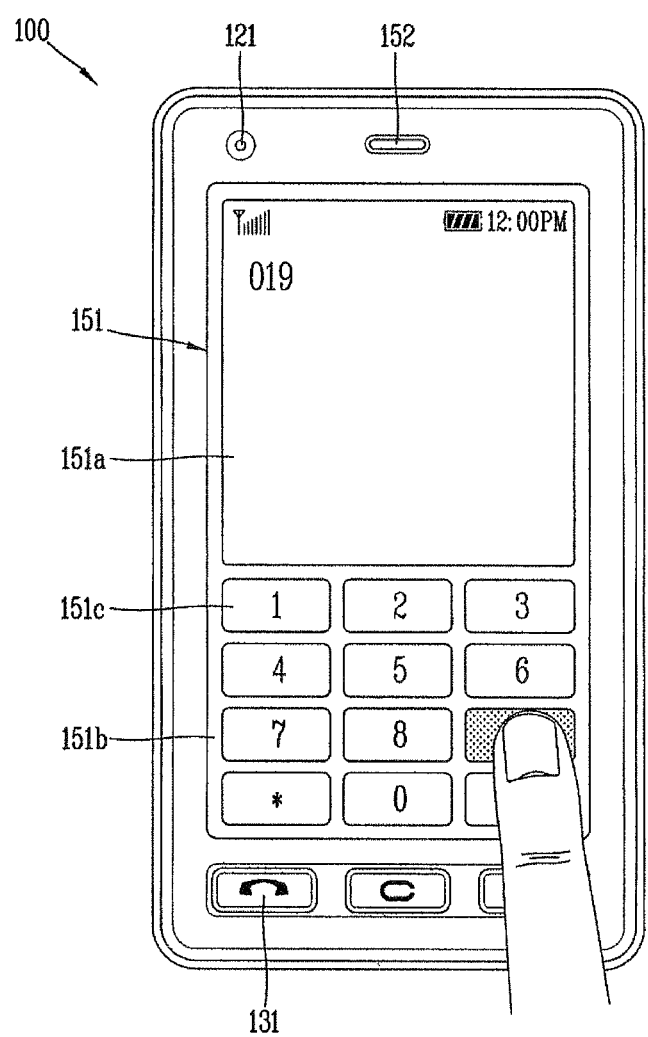
FIGS. 3A and 3B are front views of the mobile terminal for explaining operational states of the mobile terminal according to an embodiment of the present invention.
Figure 3B:
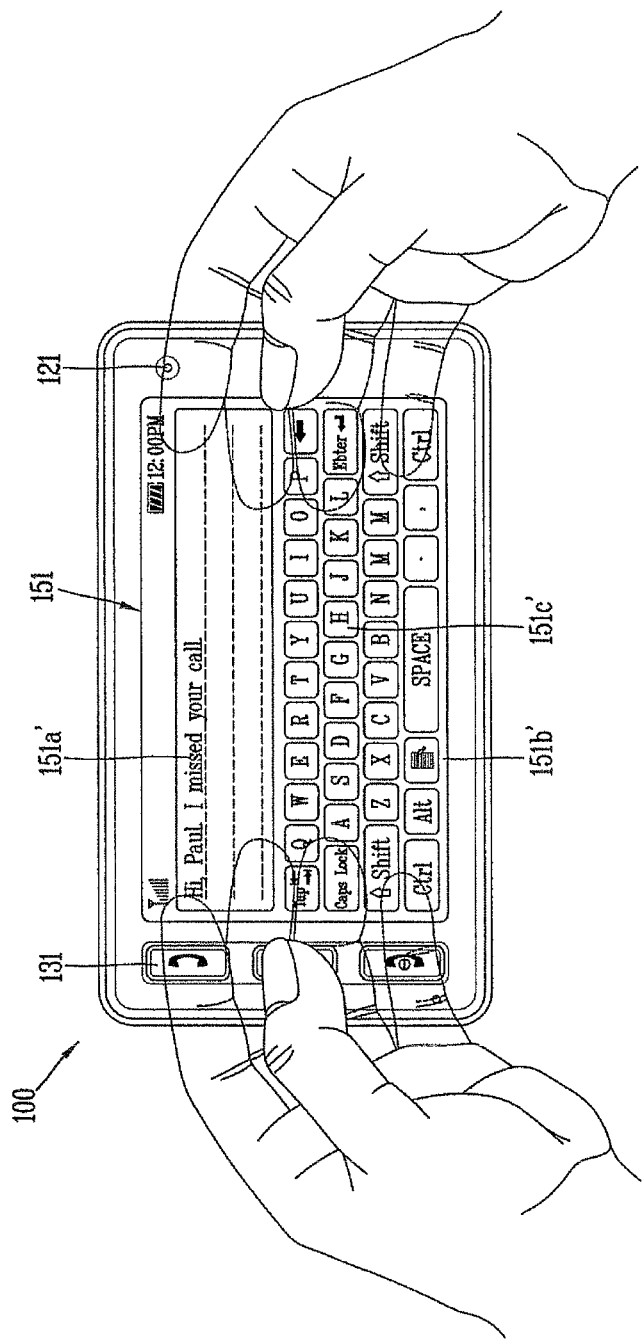

FIGS. 3A and 3B are front views of the mobile terminal for explaining an operation state of the mobile terminal according to the present invention.

Various types of visual information may be displayed on the display unit 151. The information may be displayed in the form of character, number, symbol, graphic, icon, etc.

In order to input the information, at least one of the character, number, symbol, graphic and icon is displayed in a certain arrangement so as to be implemented in the form of a keypad. Such keypad may be so-called 'soft key'.

FIG. 3A shows receiving a touch applied to a soft key on the front surface of the terminal body.

The display unit 151 may be operated as a whole region or may be divided into a plurality of regions and accordingly operated. In the latter case, the plurality of regions may be operation in association with each other.

For example, an output window 151*a* and an input window 151*b* may be displayed at upper and lower portions of the display unit 151, respectively. The output window 151*a* and the input window 151*b* are allocated to output or input information, respectively. Soft keys 151*c* including numbers for inputting a phone number or the like are outputted on the input window 151*b*. When the soft key 151*c* is touched, a number corresponding to the touched soft key is displayed on the output window 151*a*. When the first manipulation unit 131 is manipulated, a call connection with respect to a phone number displayed on the output window 151*a* is attempted.

FIG. 3B shows receiving of a touch applied to the soft key through the rear surface of the terminal body. If FIG. 3A shows a portrait in which the terminal body is disposed vertically, FIG. 3B shows a landscape in which the terminal body is disposed horizontally. The display unit 151 may be configured to convert an output screen image according to the disposition direction of the terminal body.

FIG. 3B shows an operation of a text input mode in the mobile terminal. An output window 151*a*' and an input window 151*b*' are displayed on the display unit 151. A plurality of soft keys 151*c*' including at least one of characters, symbols and numbers may be arranged on the input window 151*b*'. The soft keys 151*c*' may be arranged in the form of Qwerty keys.

When the soft keys 151*c*' are touched through the touch pad 135 (See FIG. 2B), characters, numbers, symbols, or the like, corresponding to the touched soft keys are displayed on the output window 151*a*'. Compared with a touch input through the display unit 151, a touch input through the touch pad 135 can advantageously prevent the soft keys 151*c*' from being covered by user's fingers when touching is made. When the display unit 151 and the touch pad 135 are formed to be transparent, the user's fingers put on the rear surface of the terminal body can be viewed with naked eyes, so the touch input can be more accurately performed.

Besides the input methods presented in the above-described embodiments, the display unit 151 or the touch pad 135 may be configured to receive a touch through scrolling. The user may move a cursor or a pointer positioned on an entity, e.g., an icon or the like, displayed on the display unit 151 by scrolling the display unit 151 or the touch pad 135. In addition, when the user moves his fingers on the display unit 151 or the touch pad 135, the path along which the user's fingers move may be visually displayed on the display unit 151. This would be useful in editing an image displayed on the display unit 151.

One function of the terminal may be executed in case where the display unit 151 (touch screen) and the touch pad 135 are touched together within a certain time range. The both touches may be clamping the terminal body with the user's thumb and index finger. The one function may be, for example, activation or deactivation of the display unit 151 or the touch pad 135.

The proximity sensor 141 will now be described in detail with reference to FIGS. 1 and 4.

Figure 4:
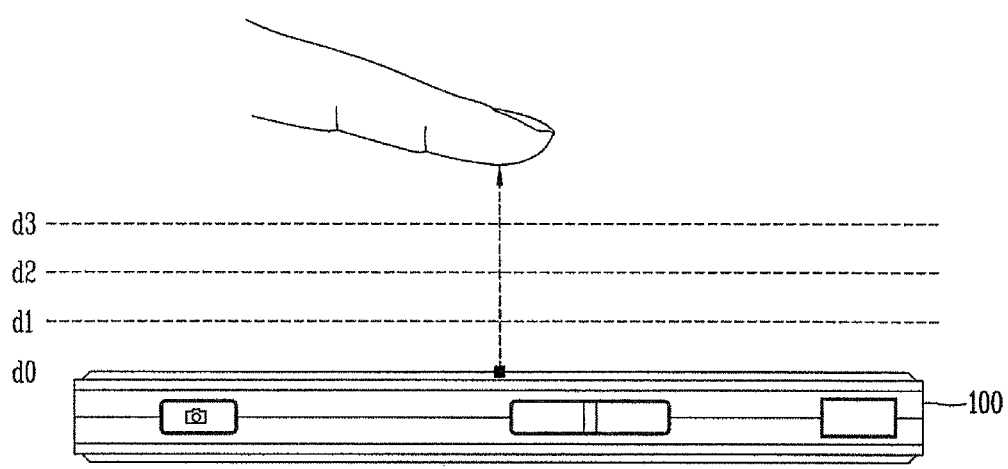
FIG. 4 is a conceptual view for explaining a proximity depth of a proximity sensor.

FIG. 4 is a conceptual view for explaining the depth of proximity of the proximity sensor.

As shown in FIG. 4, when a pointer such as the user's finger, a pen, or the like, approaches the touch screen, the proximity sensor 141 disposed within or near the touch screen detects it and outputs a proximity signal.

The proximity sensor 141 may be configured to output a different proximity signal according to the distance (referred to as a 'proximity dept', hereinafter) between the closely touched pointer and the touch screen.

FIG. 4 shows the section of the touch screen with the proximity sensor for detecting, for example, three proximity depths. The proximity sensor may detect three or less or four or more proximity depths.

In detail, when the pointer is completely brought into contact with the touch screen at d0, it is recognized as a contact touch. When the pointer is positioned to be spaced apart by shorter than a distance d1 on the touch screen, it is recognized as a proximity touch with a first proximity depth. If the pointer is positioned to be spaced apart by the distance longer than the distance d1 but shorter than a distance d2 on the touch screen, it is recognized as a proximity touch with a second proximity depth. If the pointer is positioned to be spaced apart by the distance longer than the distance d2 but shorter than a distance d3, it is recognized as a proximity touch with a third proximity depth. If the pointer is positioned to be spaced apart by longer than the distance d3 on the touch screen, it is recognized that the proximity touch has been released.

Accordingly, the controller 180 may recognize the proximity touches as various input signals according to the proximity depths and proximity positions of the pointer, and may control various operations according to the various input signals.

Figure 5:
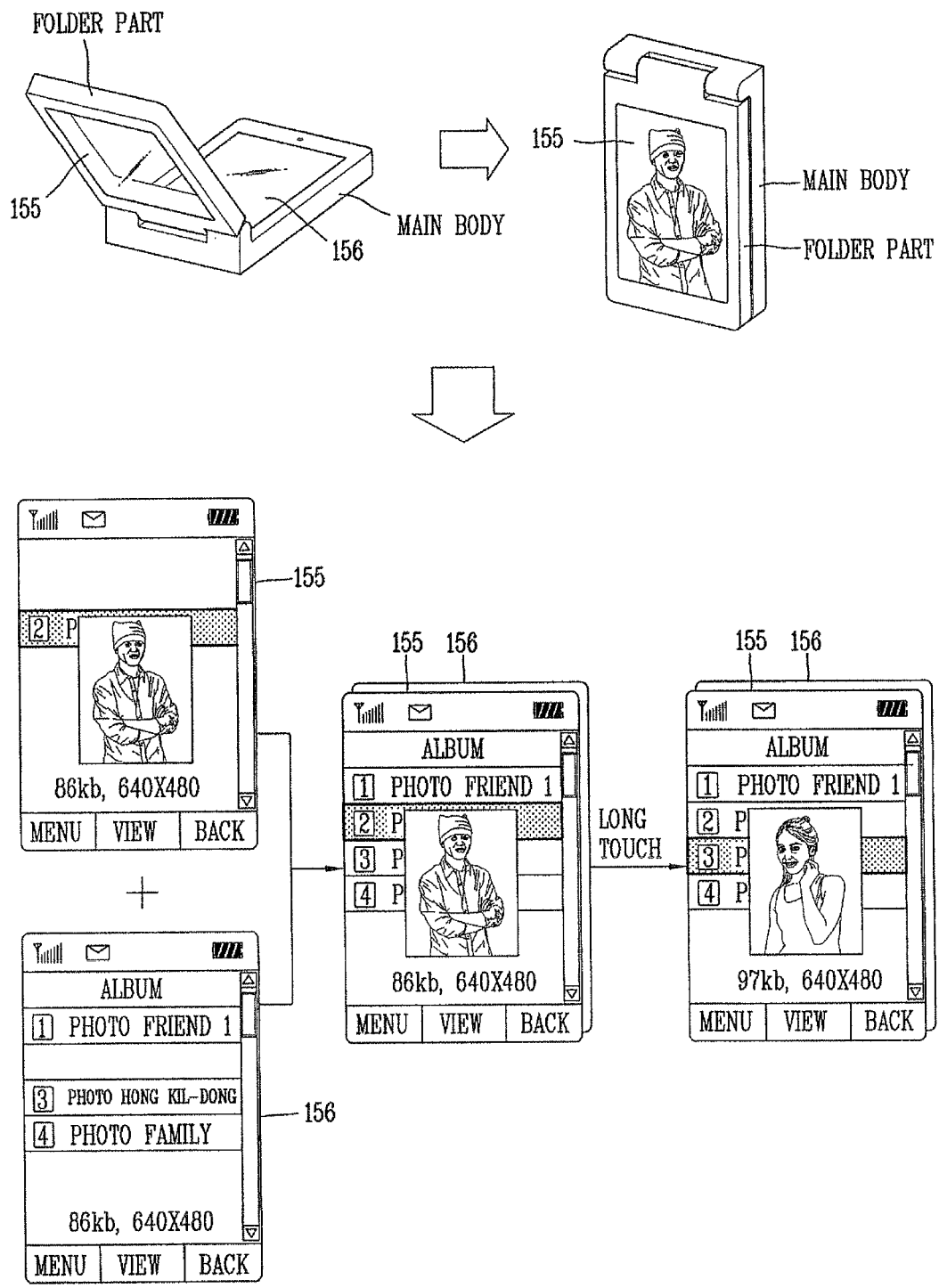
FIG. 5 is a conceptual view for explaining a method for controlling a touch operation in a configuration that a pair of display units overlap with each other.

FIG. 5 is a conceptual view for explaining a method for controlling a touch operation in a configuration that a pair of display units 155 and 156 overlap with each other.

The terminal shown in FIG. 5 is a folder type terminal in which a folder part is foldably connected with the main body. The first display unit 155 mounted on the folder part may be light-transmissive or transparent such as a TOLED, while the second display unit 156 mounted on the main body may not allow light transmission such as an LCD. The first and second display units 155 and 156 may be configured as a touch screen through which a touch can be applied.

For example, when a touch (contact touch or a proximity touch) with the TOLED is detected, the controller 180 may provide control to select or run at least one image on an image list displayed on the TOLED 155 according to a type of the touch or a touch duration.

Hereinafter, a method for controlling information displayed on a different display unit or on the LCD 156 when a touch is applied to the TOLED 155 exposed in an overlaid configuration will now be described based on input methods discriminated by a touch, a long touch, a long touch & dragging, and the like.

In the overlaid configuration (i.e., the mobile terminal is in a closed configuration), the TOLED 155 is disposed to be overlaid on the LCD 156. In this configuration, if a touch, namely, a long touch (e.g., a touch continued for longer than two or three seconds), which is different from the touch for controlling the image displayed on the TOLED 155, is detected, the controller 180 controls to select at least one image on the image list displayed on the LCD 156 according to the detected touch input. The result according to execution of the selected image is displayed on the TOLED 155.

The long touch may be used to selectively move a desired one of the entities displayed on the LCD 156 to the TOLED 155 (without execution a corresponding operation). Namely, when the user makes a long touch on one region of the TOLED 155 corresponding to a particular entity of the LCD 156, the controller 180 controls to move the corresponding entity to the TOLED 155 and display it on the TOLED 155. Meanwhile, an entity displayed on the TOLED 155 may be also moved to be displayed the LCD 156 according to a certain touch input, e.g., flicking, swirling, or the like, with respect to the TOLED 155. FIG. 5 shows the case where the menu No. 2 displayed on the LCD 156 has been moved to be displayed on the TOLED 155.

When a drag is detected together with a long touch, the controller may control to display, for example, a preview screen image of a selected image according to a function related to the image selected by the long touch on the TOLED 155. FIG. 5 shows the case where a preview (a photo image of a man) of the menu No. 2 (image file) has been performed.

With the preview screen image outputted, when dragging is additionally made on the TOLED 155 while the long touch is maintained, the controller moves a select cursor (or a select bar) of the LCD 156 and displays an image selected by the select cursor on a preview screen (a photo image of a woman). Thereafter, when the touch (long touch and dragging) ends, the controller 180 displays the first image selected by the long touch.

The touch operation (long touch and dragging) can be applied in the same manner when a sliding operation (an operation of a proximity touch corresponding to the dragging) together with a long proximity touch (i.e., a proximity touch continued for longer than at least two to three seconds).

When a touch operation other than the above-described operation is detected, the controller 180 may perform an operation in the same manner as the general touch control method.

A control method for a touch operation in the overlap form may be applied to a terminal having a single display. In addition, the control method can be also applicable to a folder type terminal having a dual-display and other terminals.

In the following embodiments, it may be assumed that an arbitrary operation screen on which a plurality of menu items are displayed is a standby screen of the terminal. The menu items may be displayed in the form of icon or text. In the following embodiments, it is assumed that the menu items are displayed in the form of icon, for the sake of convenience.

The standby screen image may refer to a screen image displayed when the terminal is in an open configuration among various operation screen images for situations. However, the standby screen image may be displayed even in a closed configuration of the terminal according to terminals. In addition, the standby screen image is described as one example of various operation screen images for situations of the terminal and the present invention is not necessarily applicable only to the standby screen image. For example, the present invention can be applicable to an operation screen image on which sub-menu items of a particular menu selected from the standby screen image.

Figure 6:
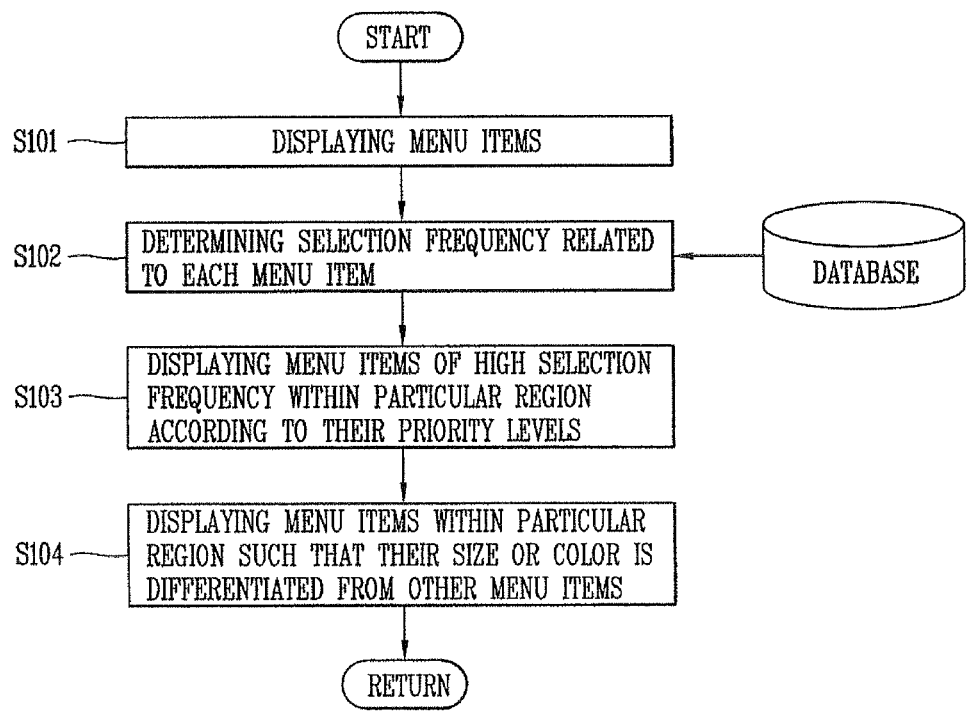
FIG. 6 is a flow chart illustrating the process of displaying menu items in the terminal according to an embodiment of the present invention.

FIG. 6 is a flow chart illustrating the process of displaying menu items in the terminal according to an embodiment of the present invention.

When the terminal is in a state of displaying an arbitrary operation screen image, the controller 180 retrieves menu items related to the operation screen image from the memory 160 and displays them (S101). At this time, the controller 180 determines a selection frequency related to each menu item (S102). The operation screen image includes the standby screen image and a screen image including sub-menu items of a particular menu.

Whenever the user selects each menu item, the controller 180 automatically counts a selection frequency of each corresponding menu item.

The selection frequency of each menu item may be stored in the form of database in the memory 160. The database may store a selection frequency of each menu item by term or time slot. Accordingly, when a selection frequency of each menu item is used, a particular term (period) or time slot may be designated.

The controller 180 determines a selection frequency of each menu item with reference to the information stored in the memory and displays the menu items with a high selection frequency at a particular region of the display module according to their priority (S103).

For example, four higher menu items with high priority, among the menu items, may be displayed within the particular region. The number of menu items displayed within the particular region may be changed according to a user selection or according to the size of the particular region (S104).

Here, the position of the particular region may be previously set by the user or as a default. For example, the position of the particular region may be the center of the display module or may be changed to a different position (e.g., an upper end portion, a lower end portion, the side portion) according to a user selection. Namely, the user may move the frequently selected menu items (menu items with high selection frequency) to a position where he can select them more conveniently, and display the same. The user may input an instruction for changing the size or position of the particular region via the user input unit 130.

The controller 180 may display the menu items displayed within the particular region such that they are differentiated in size or color from other menu items (S104). For example, the controller 180 may display the menus displayed within the particular region such that their size is larger than other menu items existing outside the particular region or their color is more vivid or clear. Accordingly, the user can easily discriminate frequently selected menu items over the other general menu items.

Figure 7:
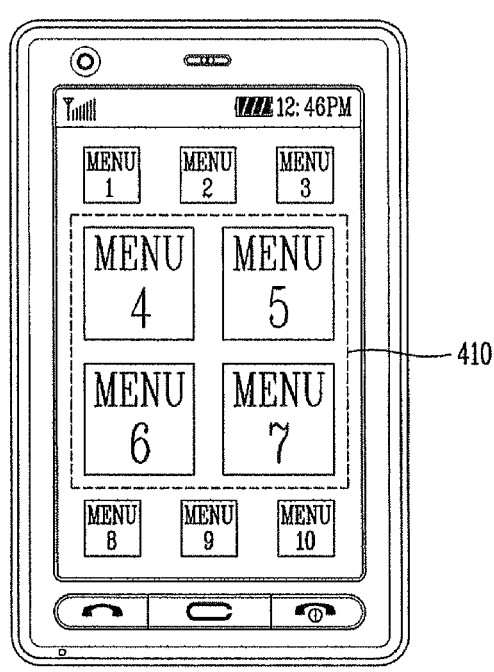
FIG. 7 is an overview of display screens illustrating a method for displaying menu items in the terminal according to an embodiment of the present invention.

FIG. 7 is an overview of display screens illustrating a method for displaying menu items in the terminal according to an embodiment of the present invention.

As shown in FIG. 7, menu items (menu 1 to menu 10) related to particular operation screen images are displayed on the display module. Here, a certain number of menu items (menu 4 to menu 7) having a high display priority are displayed at a particular region 410 of the display module.

The display priority may be determined according to a selection frequency.

The menu items displayed within the particular region 410 may be discriminately displayed such that they can be easily discriminated from other general menu items according to a pre-set option, or can be easily selected. For example, the menu items within the particular region 410 may be displayed to be larger than other general menu items or by using various colors.

Figure 8A:
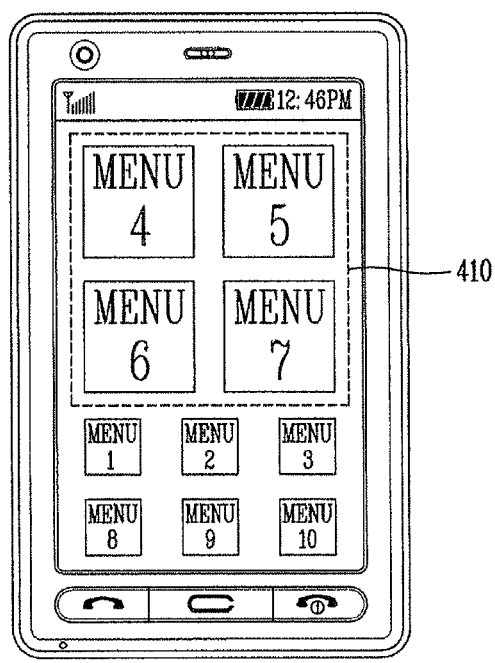
FIGS. 8A and 8B are overviews of display screens illustrating a method for displaying menu items in the terminal according to an embodiment of the present invention.
Figure 8B:
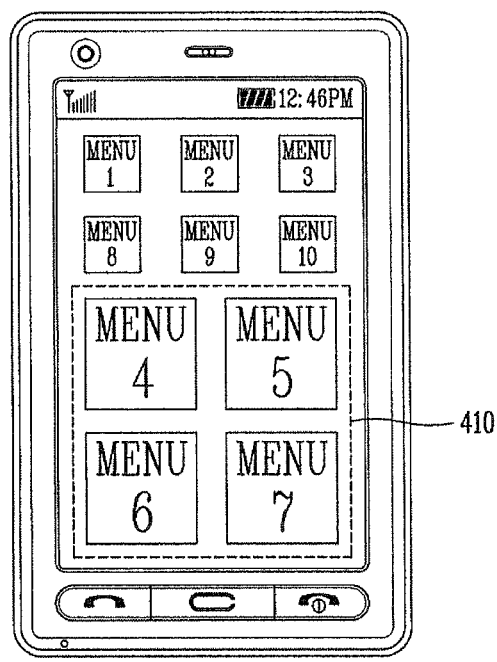

In addition, the size of the particular region 410 may be set as default or may be changed according to a user selection. In addition, the location of the particular region 410 may be set as default, and as shown in FIGS. 8A and 8B, the position of the particular region 410 may be changed to another position (e.g., upper end portion, lower end portion, the side portion) according to a user selection. Of course, the position of the particular region 410 may be changed to a position not shown in the drawing.

The outline of the particular region 410 may be displayed or may not be displayed according to a user selection. The outline of the particular region 410 may be displayed only when the size of the particular region 410 is adjusted or the particular region 410 is moved.

The particular region 410 may be displayed by using a background color as well as the outline. For example, the exterior of the particular region 410 may be displayed in white, while the interior of the particular region 410 may be displayed in red.

FIGS. 8A and 8B are overviews of display screens illustrating a method for displaying menu items in the terminal according to an embodiment of the present invention.

As described above, on the assumption that the particular region 410 is set at the center of the display module, the particular region 410 may be moved to another position according to a user selection as shown in FIG. 8A or 8B. Of course, it would be obvious that the particular region 410 can be moved to a position not shown on the drawing.

As the position of the particular region 410 is moved, the positions of the menu items outside the particular region as well as the menu items within the particular region may be changed. Namely, the controller 180 may automatically move menu items of high display priority into the particular region 410 according to a selection frequency of the menu items and display them.

The position of the particular region 410 may be changed by inputting a pre-set particular hardware direction key or a software direction key. The hardware direction key refers to a key attached to the main body of the terminal, and the software direction key refers to a key displayed on the display module. Or, one region within the particular region 410 or the outline may be selected in a tactile manner and dragged to change the position of the particular region 410. The touch method includes a proximity touch method.

When the position of the particular region 410 is changed, the changed position may be continuously maintained or temporarily maintained according to a user selection. Or, the changed position of the particular region may be applied separately only to each operation screen image or applied uniformly to every other operation screen image. Thus, in the present invention, the terminal may additionally have an environment setting option (not shown) to apply the changed position of the particular region to each operation screen image.

The method for automatically moving the menu items into the particular region according to a selection frequency of each menu item and displaying the same have been described. A method for moving an arbitrary menu item to the particular region directly by the user and displaying the same will now be described.

Figure 9:
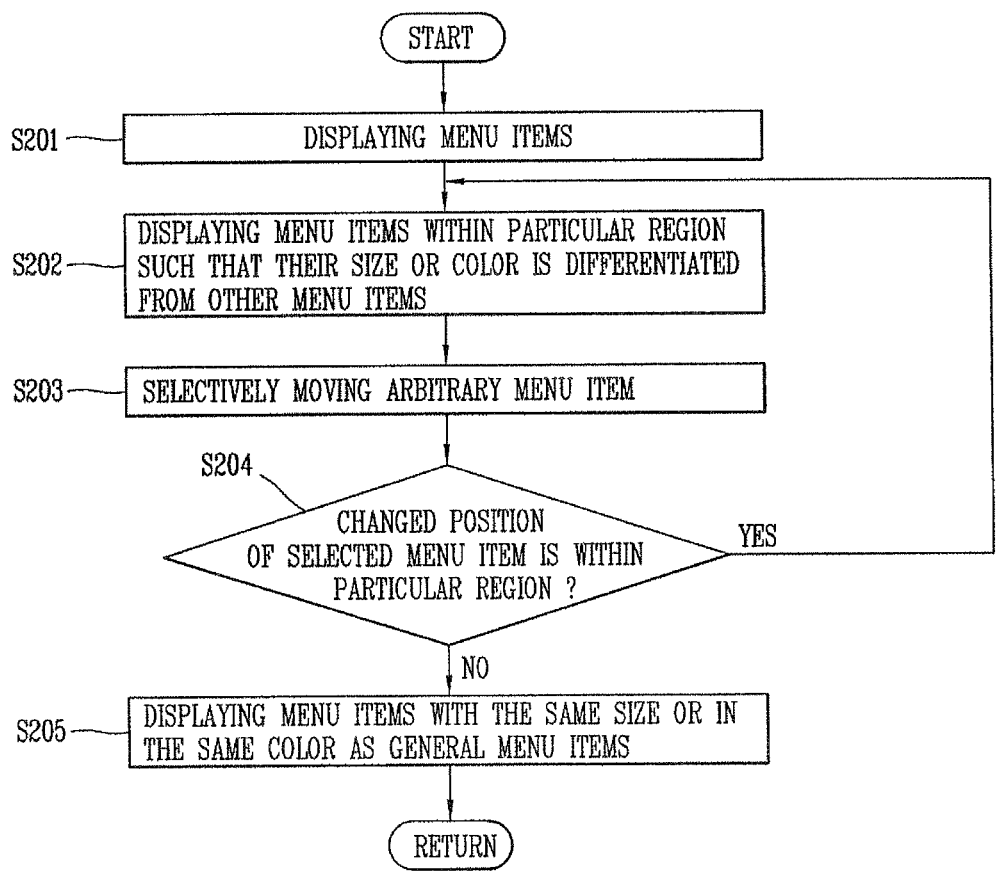
FIG. 9 is a flow chart illustrating the process of moving the position of arbitrary menu items into a particular region and displaying the same.

FIG. 9 is a flow chart illustrating the process of moving the position of arbitrary menu items into a particular region and displaying the same.

When the terminal displays an arbitrary operation screen image, the controller 180 retrieves menu items related to the operation screen image from the memory 160 and displays them (S201). And then, the controller displays menu items within the particular region among the menu items by differentiating them in size or color from other general menu items outside the particular region (S202).

As described above, the position of the particular region may be previously set by the user or set as default. For example, the position of the particular region may be the central portion of the display module and may be changed to another position according to a user selection. Namely, the user may move the frequently selected menu items to a position from which he can easily select them, and display it.

The menu items within the particular region are pre-set menu items, and may be changed to other menu items by the user. The method for changing the menu items will now be described.

When an arbitrary menu item within or outside the particular region is selected and moved (S203), the controller determines whether or not the current (changed) position of the selected menu item is within the pre-set particular region or outside the particular region (S204).

If the changed position of the selected menu item is within the pre-set particular region, the controller repeatedly performs step S202. If, however, the changed position of the selected menu item is outside the pre-set particular region, the controller displays it in the same manner as that of other general menu items (S205). Namely, the controller displays the selected menu item in the same size or same color as that of the general menu items.

Meanwhile, as the menu items are moved, the size of the particular region may be automatically changed. For example, if an arbitrary menu item within the particular region is taken out and moved to outside the particular region, the controller 180 may automatically reduce the size of the particular region as large as a region secured as the menu item was removed. If an arbitrary menu item outside the particular region is moved into the particular region, the controller 180 may automatically magnify the size of the particular region by a region to be enlarged as the menu item is added.

In addition, when the size of the particular region is changed, the size and shape of the menu items within the particular region may be changed accordingly. Although not shown, the color of the menu items within the particular region may be changed according to a user selection. In addition, the shape, color, or size of all the menu items within the particular region may be collectively changed automatically through an environment setting option (not shown) of the particular region.

However, when a menu item outside the particular region and a menu item within the particular region are simply interchanged in their position, the size of the particular region does not need to be changed. For example, one menu item within the particular region is moved out and one menu item outside the particular region is moved into the particular region, the size of the particular region does not need to be changed.

The method for changing the position of the menu items will now be described.

Figure 10:
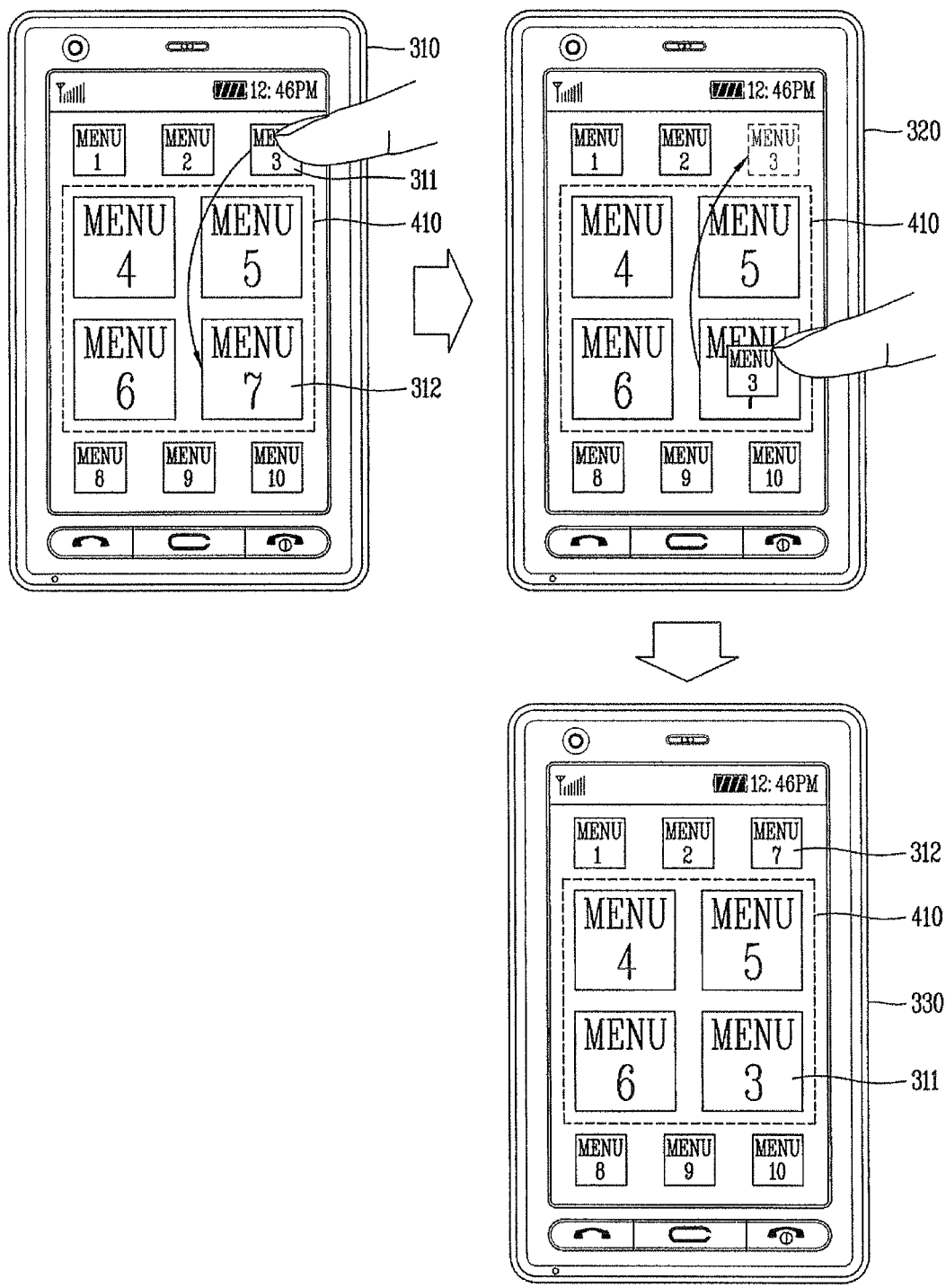
FIG. 10 is an overview of display screens illustrating a method for moving the position of arbitrary menu items by a user in the terminal according to an embodiment of the present invention.

FIG. 10 is an overview of display screens illustrating a method for moving the position of arbitrary menu items by a user in the terminal according to an embodiment of the present invention.

The position of arbitrary menu items may be changed by using a pre-set particular hardware direction key or a software direction key. In addition, the user may directly select the arbitrary menu item in a tactile manner and drag it to an arbitrary position.

The method for selecting the menu items in the tactile manner and moving their position will now be described.

It is assumed that the particular region 410 is set at the central portion of the display module. Also, it is assumed that the user selects an arbitrary menu item 311 outside the particular region 410 in a tactile manner and drags it on a particular menu item 312 within the particular region 410 (310).

When the arbitrary menu item 311 is selected and dragged on the particular menu item 312 within the particular region 410 (320), the position of the arbitrary menu item 311 and that of the particular menu item 312 are interchanged and displayed.

Meanwhile, the user may move the entire menu items in a particular direction. In other words, the user can move all the menu items displayed on the display module up and down or to the left or right according to their arrangement order and display them.

The method for moving the entire menu items displayed on the display module in one direction and displaying them will now be described.

Figure 11A:
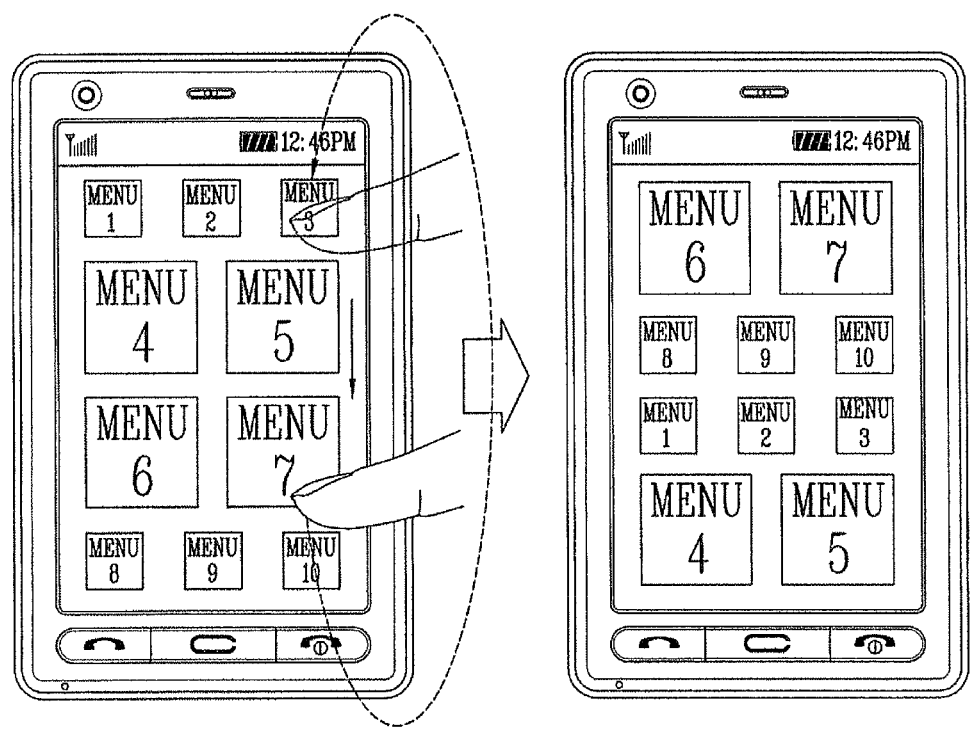
FIGS. 11A and 11B are overviews of display screens illustrating a method for moving the whole menu items in one direction and displaying them according to an embodiment of the present invention.
Figure 11B:
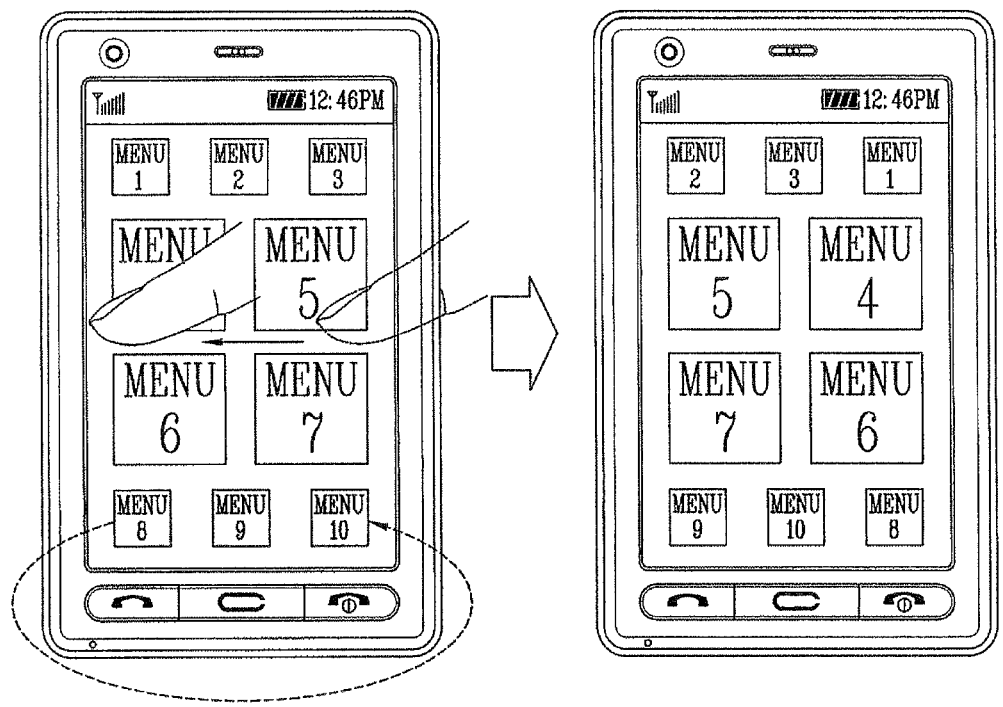

FIGS. 11A and 11B are overviews of display screens illustrating a method for moving the whole menu items in one direction and displaying them according to an embodiment of the present invention.

As illustrated, it is assumed that a plurality of menu items are displayed on the display module. The menu items include general menu items (menu 1 to menu 3, menu 8 and menu 9) and menu items (menu 4 to menu 7) to be emphasized.

As shown in FIG. 11A, when the user touches a space between the menu items and drags it in a downward direction, the menu items displayed at the lower end portion (menu 8 to menu 10, menu 6 and menu 7) disappear sequentially according to the arrangement order of the menu items, and not displayed any longer. And then, the menu items (menu 8 to menu 10, menu 6 and menu 7) which have disappeared appear sequentially from the upper end portion and displayed. Although not shown, when the user touches a space between the menu items and drags it in the upward direction, the menu items (menu 1 to menu 3, menu 4 and menu 5) displayed at the upper end portion sequentially disappear according to the arrangement order of the menu items, not displayed any longer. And then, the menu items which have disappeared may sequentially appear from the lower end portion and displayed.

As shown in FIG. 11B', when the user touches a space between the menu items and drags it in the left direction, the menu items (menu 1, menu 4, menu 6, menu 8) displayed at the left end sequentially disappear according to the arrangement of the menu items, not displayed any longer. And then, the menu items which have disappeared may sequentially appear from the right end and displayed. Although not shown, when the user touches a space between the menu items and drags it in the right direction, the menu items (menu 3, menu 5, menu 7, menu 10) displayed at the right end sequentially disappear, not displayed any longer, and then, the menu items which have disappeared may sequentially appear from the left end and displayed.

In this embodiment, in order to move the entire menu items in one direction, the space between the menu items is touched. However, a particular menu item, as well as the space between the menu items, may be long-touched. Namely, the operation of selecting menu items and the operation of executing menu items may be discriminated by using the various touch methods as described above.

As described above, in the present invention, the menu items displayed on an arbitrary operation screen are moved to be displayed at a position from which the user can easily select them. In addition, because the size or color of the menu items frequently selected by the user is differentiated from that of the general menu items, the user can easily select the menu items. In addition, the entire arrangement of the menu items displayed on the terminal can be moved in an arbitrary direction and displayed for user convenience.

In an embodiment of the present invention, the above-described method can be implemented as software codes that can be read by a computer in a program-recorded medium. The computer-readable medium may include various types of recording devices in which data that can be read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). In addition, the computer may include the controller 180 of the terminal.

According to one or more embodiments, a method provides moving menu items displayed on an arbitrary operation screen to a position where the user can easily select them, and a terminal implementing the same.

The method may also display menu items at a particular region, among menu items displayed on an arbitrary operation screen, by differentiating the size or color of the menu items at the particular region, and a terminal implementing the same.

The method may also display particular menu items, among menu items displayed on an arbitrary operation screen, at a particular region according to a selection frequency, and a terminal implementing the same.

The method may also display particular menu items, among menu items displayed on an arbitrary operation screen, by magnifying or reducing the particular menu items according to a selection frequency, and a terminal implementing the same.

The method may also display particular menu items, among menu items displayed on an arbitrary operation screen, such that the particular menu items are differentiated in color from other menu items according to a selection frequency, and a terminal implementing the same.

According to one or more additional embodiments, a mobile terminal includes: a display unit; a controller for displaying arbitrary menu items on the display unit such that menu items at a particular position are differentiated from menu items at a different position, and a user input unit for selectively moving the position of the menu items by a user.

According to another embodiment, a menu display method of a terminal includes: displaying an arbitrary operation screen image and menu items related to the operation screen image; and displaying menu items at a particular position, among the menu items, such that they are differentiated from menu items at a different position. In the mobile terminal, particular menu items among the menu items displayed on an arbitrary operation screen can be moved to and displayed at a position where the user can easily select them.

In the mobile terminal, the menu items at a particular region, among menu items displayed on an arbitrary operation screen, can be displayed to be differentiated in size or color from general menu items.

In the mobile terminal, particular menu items, among the menu items displayed on an arbitrary operation screen, can be displayed at a particular region according to a selection frequency, and can be displayed such that they are magnified or reduced relatively compared with general menu items.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a display configured to be touch sensitive and having a specific region, wherein one or more graphical icons are displayed on the display; and
    a controller configured to:
        receive a first touch input for selecting a graphical icon from among the one or more graphical icons;
        determine a selection frequency of the selected graphical icon in response to the first touch input, wherein the controller determines a selection frequency of each of the one or more graphical icons whenever one of the one or more graphical icons is selected, wherein priority information related to the selection frequency of each of the one or more graphical icons is stored in a memory;
        display, at the specific region of the display, at least one graphical icon having a high selection frequency relative to the selection frequencies of the one or more graphical icons, wherein the at least one graphical icon is displayed at the specific region according to the priority information, and wherein a size of the at least one graphical icon provided in the specific region of the display is larger than other graphical icons provided in a remaining area of the display,
        receive a second touch input for moving a first graphical icon among the at least one graphical icon included in the specific region;
        determine whether or not the first graphical icon is moved to the specific region or outside the specific region in response to the second touch input, wherein:
            when the first graphical icon is moved within the specific region, sizes of the first graphical icon and the specific region are maintained, and
            when the first graphical icon is moved to outside the specific region from the specific region, sizes of the first graphical icon and the specific region are reduced;
        receive a third touch input for moving a second graphical icon included in outside of the specific region;
        determine whether or not the second graphical icon is moved to within the specific region or outside the specific region in response to the third touch input, wherein:
            when the second graphical icon is moved within outside the specific region, sizes of the second graphical icon and the specific region are maintained, and
            when the second graphical icon is moved to within the specific region from outside the specific region, sizes of the second graphical icon and the specific region are enlarged.

2. The mobile terminal of claim 1, wherein a position of the specific region is changed according to a fourth touch input.

3. The mobile terminal of claim 1, wherein the controller provides an indication of a size and a position of the specific region using at least one of a background color or an outline for display on the display.

4. The mobile terminal of claim 1, wherein the controller displays the other graphical icons provided in the remaining area in a size or a color distinguishable from the at least one graphical icon.

5. The mobile terminal of claim 4, wherein the controller displays the size of the other graphical icons provided in the remaining area to be smaller than the size of the at least one graphical icon provided in the specific region.

6. The mobile terminal of claim 1, wherein the size of the at least one graphical icon provided in the specific region is larger than a size of the other graphical icons provided in the remaining area.

7. A method for controlling a mobile terminal, comprising:
    displaying one or more graphical icons on a display, wherein the display includes a specific region;
    receiving, via the display, a first touch input for selecting a graphical icon from among the one or more graphical icons;
    determining a selection frequency of the selected graphical icon in response to the first touch input;
    determining a selection frequency of each of the one or more graphical icons whenever one of the one or more graphical icons is selected;
    storing, in a memory, priority information related to the selection frequency of each of the one or more graphical icons;
    displaying, at the specific region of the display, at least one graphical icon having a high selection frequency relative to the selection frequencies of the one or more graphical icons, wherein the at least one graphical icon is displayed at the specific region according to the priority information;
    receiving a second touch input for moving a first graphical icon among the at least one graphical icon included in the specific region;
    determining whether or not the first graphical icon is moved to the specific region or outside the specific region in response to the second touch input, wherein:
        when the first graphical icon is moved within the specific region, sizes of the first graphical icon and the specific region are maintained, and when the first graphical icon is moved to outside the specific region from the specific region, sizes of the first graphical icon and the specific region are reduced;

receiving a third touch input for moving a second graphical icon included in outside of the specific region;

determining whether or not the second graphical icon is moved to within the specific region or outside the specific region in response to the third touch input, wherein:

when the second graphical icon is moved within outside the specific region, sizes of the second graphical icon and the specific region are maintained, and when the second graphical icon is moved to within the specific region from outside the specific region, sizes of the second graphical icon and the specific region are enlarged.

8. The method of claim 7, wherein a position of the specific region is changed according to a fourth touch input.

9. The method of claim 7, further comprising:

controlling a size and a position of the specific region using at least one of a background color or an outline to be displayed on the display.

10. The method of claim 7, further comprising:

displaying the other graphical icons provided in the remaining area in a size or a color distinguishable from the at least one graphical icon.

11. The method of claim 7, further comprising:

displaying a size of other graphical icons provided in a remaining area to be smaller than a size of the at least one graphical icon provided in the specific region.

12. The method of claim 7, wherein the size of a at least one graphical icon provided in the specific region is larger than a size of a other graphical icons provided in a remaining area.

13. The mobile terminal of claim 1, wherein the controller:

changes locations of the specific region and the remaining area based on a command, wherein sizes of the specific region and remaining area do not change when the locations of the specific region and the remaining area change.

14. The mobile terminal of claim 13, wherein icons in the specific region do not change in size when the location of the specific region is moved, and wherein icons in the remaining area do not change in size when the location of the remaining area is moved.

15. The mobile terminal of claim 14, wherein:

the specific region is at a first location, the remaining area is at a second location, and when the locations of the specific region and the remaining area are moved, the specific region is moved to the second location and the remaining area is moved to the first location.

16. The method of claim 7, further comprising:

changing locations of the specific region and the remaining area based on a command, wherein sizes of the specific region and remaining area do not change when the locations of the specific region and the remaining area change.

17. The method of claim 16, wherein icons in the specific region do not change in size when the location of the specific region is moved, and wherein icons in the remaining area do not change in size when the location of the remaining area is moved.

18. The method of claim 17, wherein:

the specific region is at a first location, the remaining area is at a second location, and when the locations of the specific region and the remaining area are moved, the specific region is moved to the second location and the remaining area is moved to the first location.

* * * * *